United States Patent Office 3,709,948
Patented Jan. 9, 1973

3,709,948
REARRANGEMENT OF BROMOFLUORINATED PROPENE
Robert Neville Haszeldine, Disley, Ronald Eric Banks, Torkington, and David Robin Taylor, Bramhall, England (all % Pennwalt Corporation, 900 1st Ave., King of Prussia, Pa. 19406)
No Drawing. Filed June 26, 1969, Ser. No. 836,948
Claims priority, application Great Britain, July 12, 1968, 33,407/68
Int. Cl. C07c 21/18
U.S. Cl. 260—653.3                                    1 Claim

ABSTRACT OF THE DISCLOSURE

The new compound perfluoro(methylacetylene) is prepared by a series of reactions involving the new intermediate compounds 3-bromo-1,1,3,3-tetrafluoropropene; 1,2,3-tribromo-1,1,3,3-tetrafluoropropane; 2,3-dibromo - 1,1,3,3-tetrafluoropropene; and 1,2 - dibromo-1,3,3,3-tetrafluoropropene.

---

This invention is concerned with the novel compound perfluoro(methylacetylene), a method for its preparation, and the novel intermediates formed in its preparation. According to this method, dibromodifluoromethane is reacted with 1,1-difluoroethylene, for example, at an elevated temperature and in the presence of an organic peroxide, such as benzoyl peroxide, to give 1,3 - dibromo-1,1,3,3-tetrafluoropropane. Dehydrobromination of this compound gives 3-bromo-1,1,3,3-tetrafluoropropene which is then brominated to give 1,2,3-tribromo-1,1,3,3-tetrafluoropropane. Dehydrobromination then gives 2,3-dibromo-1,1,3,3-tetrafluoropropene which is capable of molecular rearrangement to 1,2-dibromo-1,3,3,3-tetrafluoropropene. Debromination then gives perfluoro(methylacetylene) in good yield.

Two noteworthy steps in the above route are the dehydrobromination of 1,3 - dibromo-1,1,3,3-tetrafluoropropane, which may be carried out by heating under reduced pressure in the presence of a mixture of carbon and silica, and the molecular rearrangement of 2,3-dibromo-1,1,3,3-tetrafluoropropene to 1,2 - dibromo-1,3,3,-tetrafluoropropene, which may be carried out at room temperature or below in the presence of aluminum bromide.

The bromination of 3 - bromo-1,1,3,3-tetrafluoropropene may be carried out conventionally by reaction with bromine and the subsequent dehydrobromination by treatment with aqueous potassium hydroxide. The final debromination may be carried out by refluxing 1,2-dibromo-1,3,3,3-tetrafluoropropene with zinc in the presence of dioxane.

The complete reaction scheme is as follows:

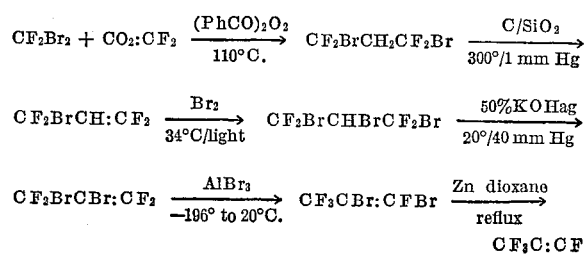

The present invention also includes as novel compounds the foregoing intermediates of the formulae:

$CF_2BrCH:CF_2$
$CF_2BrCHBrCF_2Br$
$CF_2BrCBr:CF_2$
$CF_3CBr:CFBr$

The method of this invention is clarified by referring to the following example wherein, according to the reaction scheme and conditions set out above, dibromodifluoromethane was reacted with 1,1-difluoroethylene to give 1,3-dibromo-1,1,3,3-tetrafluoropropane in 62% yield. Dehydrobromination gave 3-bromo-1,1,3,3-tetrafluoropropene in 86% yield. Bromination gave 1,2,3-tribromo-1,1,3,3-tetrafluoropropane in 92% yield which was dehydrobrominated in 91% yield. The 2,3-dibromo-1,1,3,3-tetrafluoropropene cooled and treated with $AlBr_3$ underwent molecular rearrangement to give 1,2-dibromo-1,1,3,3-tetrafluoropropene in 97% yield and cis:trans ratio of 60:40. Refluxing of the cis/trans product with zinc in dioxane gave product perfluoro(methylacetylene) in 43% yield.

The intermediates and product were identified by elemental analysis and spectroscopic methods. Perfluoro (methylacetylene) is a colorless gas, B.P. −50° C. Infrared spectroscopic analysis shows strong absorption at $4.24\mu$ and the $^{19}F$ n.m.r. spectrum (35°/56.46 mc./sec.) shows two absorptions [$\phi_{CF_3}$ 50.8 (doublet); $\phi_F$ (quartet) 203.0 $|J_{FF}|$ 4.3 c./sec.] with relative intensity 3.1 [for the $^{13}C$ satellite of the $\phi$ 50.8 doublet $|J_{CF}|=259.0$ ($\delta_{CF}=+132\pm0.005$) and $|J_{CCF}|=57.7$ c./sec.

($\delta_{CCF}=0.011\pm0.002$ p.p.m.)]

Perfluoro(methylacetylene) undergoes no change when stored in glass at 25°/10 cm. Hg for 1 month or at 20°/ 1.25 atm. for 4 days. Perfluoro(methylacetylene) decomposes slowly in water and reacts with potassium fluoride in the presence of formamide to give 1,1,3,3-pentafluoropropene. Compared with the highly explosive nature of monofluoroacetylene, perfluoro(methylacetylene) shows surprising stability. Perfluoro(methylacetylene) undergoes copolymerization with various comonomers as shown for its hydrocarbon analogue, propyne, in Belgian Pat. 624,654 and British Pat. 889,730 and 897,099; however, the copolymers having the fluorinated segments derived from perfluoro(methylacetylene) have considerably greater thermal stability.

We claim:
1. The method of treating 2,3 - dibromo-1,1,3,3-tetrafluoropropene with aluminum bromide to produce 1,2-dibromo-1,1,3,3-tetrafluoropropene by molecular rearrangement thereof.

References Cited

UNITED STATES PATENTS 2,546,997   4/1951   Gochenour ........ 260—653.3

OTHER REFERENCES

Jacobs et al., J. Am. Chem. Soc. 81, 606–610 (1959), copy in P.O. Search Center, Call No. QD1.A5.

Banks et al.: Tetrahedron Letters 36, 3909–3910 (July 1968), copy in P.O. Search Center, Call No. QD241.T42.

Schohekotkhin et al., Chem. Abstracts 58, 6680b (1963).

Fainberg et al., J. Org. Chem. 30, 864 and 870 (1965).

DANIEL D. HOROWITZ, Primary Examiner

U.S. Cl. X.R.

260—653, 653.1 T, 653.5

PO-1050
(5/69)

UNITED STATES PATENT OFFICE
CERTIFICATE OF CORRECTION

Patent No. 3,709,948          Dated January 9, 1973

Inventor(s) Robert Neville Haszeldine, Ronald Eric Banks, David Robin Taylor

It is certified that error appears in the above-identified patent and that said Letters Patent are hereby corrected as shown below:

Column 1, line 44 "-1,3,3," should read --1,3,3,3, --;
Column 1, line 60 that portion of the formula reading "$CO_2:CF_2$" should read --$CH_2:CF_2$-- ;
Column 1, line 62 that portion of the formula reading "50%KOHag" should read --50%KOHaq-- ;
Column 1, last line that portion of the formula reading $CF_3C:CF$" should read --CF C⋮CF -- ;
Column 2, line 18 "1,1,3,3" should read --1,3,3,3 -- ;
Column 2, line 30 that portion of the formula reading "+132" should read --+0.132 -- ;
Column 2, Claim 1, line 50 "1,1,3,3" should read --1,3,3,3--

Signed and sealed this 22nd day of May 1973.

(SEAL)
Attest:

EDWARD M. FLETCHER, JR.
Attesting Officer

ROBERT GOTTSCHALK
Commissioner of Patents